United States Patent [19]

Yatsuzuka

[11] Patent Number: 4,963,875

[45] Date of Patent: Oct. 16, 1990

[54] DEVICE FOR CODING AN ANALOG IMAGE SIGNAL INTO A BINARY SIGNAL

[75] Inventor: Yasuhumi Yatsuzuka, Nara, Japan

[73] Assignee: Sharp Kabushiki Kaisha, Osaka, Japan

[21] Appl. No.: 307,529

[22] Filed: Feb. 8, 1989

[30] Foreign Application Priority Data

Feb. 9, 1988 [JP] Japan .................................. 63-28429

[51] Int. Cl.⁵ ............................................ H03M 1/38
[52] U.S. Cl. ...................................... 341/164; 382/50
[58] Field of Search ............... 341/143, 155, 163, 164; 382/50, 52

[56] References Cited

U.S. PATENT DOCUMENTS 4,556,125  1/1986  Clunn ..................................... 382/50
4,766,332  8/1988  Pelgrom et al. ...................... 382/50

Primary Examiner—William M. Shoop, Jr.
Assistant Examiner—Marc S. Hoff

[57] ABSTRACT

In a device for coding analog image signals from an image sensor into binary image signals, there is provided a feed back circuit for averaging the image signal derived from the image sensor. A comparator compares the signal derived from the image sensor and the averaged signal for coding the analog image signal into binary image signal.

7 Claims, 2 Drawing Sheets

DEVICE FOR CODING AN ANALOG IMAGE SIGNAL INTO A BINARY SIGNAL

BACKGROUND OF THE INVENTION

1. Field of the Invention

The present invention relates to a binary coding device use mainly converting analog signals obtained from an image sensor to binary coded signals.

2. Description of the Prior Art

It has been known that when analog image signals obtained from an image sensor are converted into binary image data by quantization of the analog image signal on the basis of a fixed threshold level, if the entire object to be photographed is bright or dark, the details of the object can not be precisely expressed. In order to eliminate this drawback, in the prior art, all of the digital image data are stored in a memory and the digital image data are subjected to a Laplace conversion. The digital image data are then again quantized on the basis of the partial threshold level.

However, in order to perform the data processing mentioned above, it is necessary to provide a large memory and, subsequently, it takes a long time for the data processing to be completed.

SUMMARY OF THE INVENTION

An essential object of the present invention is to provide a device for coding the analog image signal, obtained by an image sensor, in a binary form in which the analog image signal can be coded directly in binary form without using memory means in a real time manner.

In order to accomplish the object mentioned above, according to the present invention, there is provided a device for coding analog image signal from an image sensor into binary image signals which comprises:

low pass filter means for deriving a low frequency component signal from the analog image sensor and for integrating the derived low frequency component signal;

feed back circuit means for sampling and holding the low frequency component signal derived from said low pass filter means and for feeding back the sampled and held signal so as to add the sampled and held signal and the analog image signal; and comparator means for coding the analog image signal into a binary image signal by comparing the low frequency component signal and the analog image signal using the low frequency component signal as a threshold signal of the comparator means.

In the device according to the present invention, the analog image signal obtained from the image sensor is applied to the low pass filter means in which the low frequency component signal contained in the analog image signal is derived and integrated. The low frequency component signal thus derived and integrated is sampled and held in the feed back loop means and the sampled and held signal is added to the analog image signal. As a result, the level of the low frequency signal generated due to unevenness of a light source and camera system and contained in the analog image signal can be averaged. The averaged low frequency signal obtained from the low pass filter means is applied to the comparator means as the threshold value. The analog image signal from the image sensor is also applied to the comparator means and coded into binary form based on the threshold value. Accordingly, the analog image signal can be coded into binary form with the threshold value corresponding to the average signal level depending on the position of the image in a real time manner.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
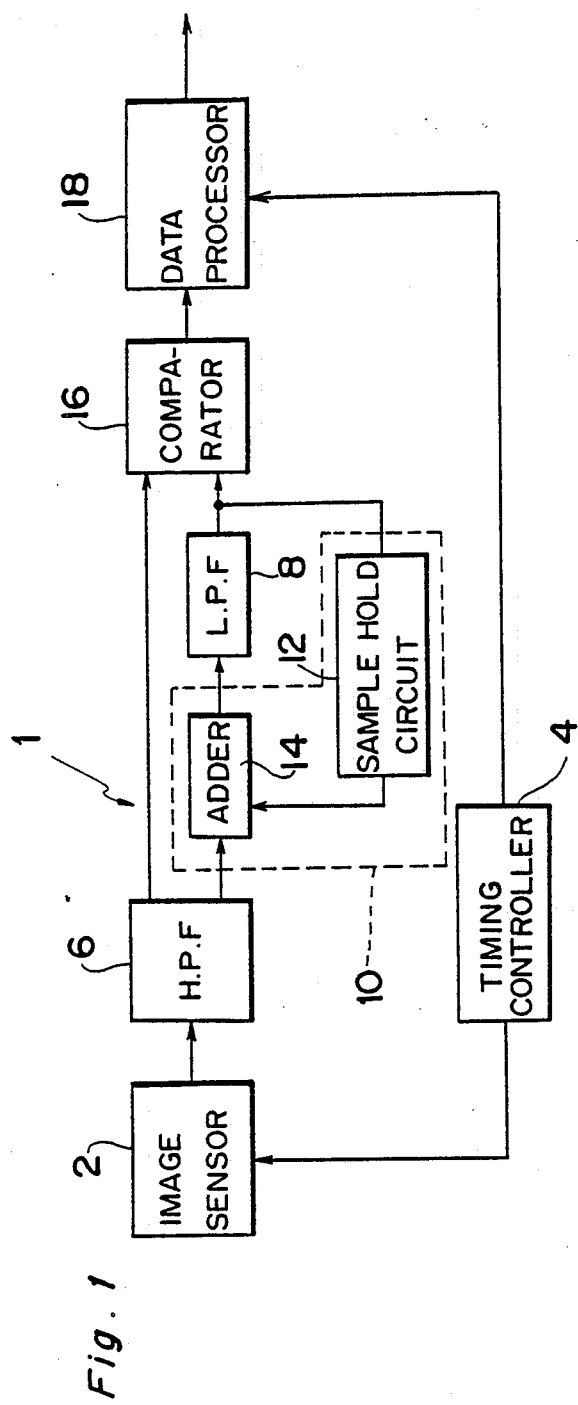
FIG. 1 is a circuit diagram showing an embodiment of the device according to the present invention.
Figure 2:
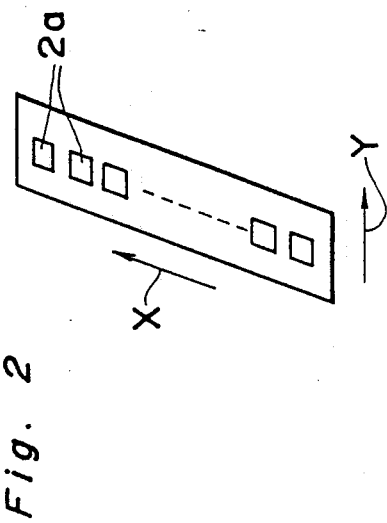
FIG. 2 is a schematic diagram showing an example of an image sensor used in the embodiment shown in FIG. 1.

Referring to FIG. 1, there is shown a binary coding device according to the present invention generally designated by the reference numeral 1. A two dimensional image sensor 2 comprises a plurality of image sensing cells 2a, such as CCD camera cells or amorphous silicon camera cells, lined up in a main scanning direction X in one dimension, as shown in FIG. 2. Each of the image sensing cells 2a generates an analog signal representing the color and brightness of an object to sensed in synchronism with the timing clock generated from a timing clock controller 4. A high pass filter 6 is connected to the output terminal of the image sensor 2 for deriving high frequency components contained in the analog signals fed from the image sensor 2. Since the analog signals from the image sensor 2 contain a given level of a DC (direct current) component and image signals having levels corresponding to the color and concentration (brightness and darkness) of the object, the high pass filter 6 eliminates the DC component. In the case that the level of the DC component is stabilized, the high pass filter 6 may be omitted. The high pass filter 6 also eliminates undesired noise contained in the output signals of the image sensor 2.

Reference numeral 8 denotes a low pass filter for deriving relatively low frequency signals and integrating the low frequency signals thus derived. Passing of the image signals through the low pass filter enables the derivation of low frequency component of the image signals which are generated due to the shading or uneven brightness of the light source and the object. Disposed between the high pass filter 6 and low pass filter 8 is a feed back circuit comprising a sample hold circuit 12, for sampling and holding the output signal of the low pass filter 8 in synchronism with the scanning in the sub scanning direction of the image sensor 2 (in a Y direction in FIG. 2), and an adder 14 for adding the output of the sample hold circuit 12 and the output of the high pass filter 6. The feed back circuit 10 acts as a low pass filter for deriving the low frequency component of the image signal of the image in the sub scanning direction. Reference numeral 16 denotes a comparator for comparing the low frequency signal obtained from the low pass filter 8 with the signal obtained from the high pass filter 8 so as to code the analog image signal obtained from the high pass filter 6 in binary form using the low frequency signal output from the low pass filter 8 as a threshold voltage. A data processing unit 18 receives the binary image data from the comparator 16 synchronism with the timing clocks fed from the timing controller 4.

When it is assumed that the image sensor is constructed of 1024 bits with 1 MHz drive, in order to cut the frequency of 1 MHz ×3/1024=2. 9 KHz due to the unevenness of the light source, the lower cut frequency of the high pass filter is 3 KHz (−3dB). As the low pass filter, a 500 KHz (−3dB) low pass filter is used because the reproduction of the picture element for 1 MHz sampling is ½ of Nyquist limit value.

In the arrangement mentioned above, the analog image signal from the image sensor 2 is applied to the high pass filter 6, in which the DC component and noise in the analog image signal can be eliminated. The analog image signal from which the DC component and noise component are eliminated (referred to as a filtered analog image signal) is applied to one input of the comparator 16 and to the low pass filter 8 through the adder circuit 14. In the low pass filter 8, the low frequency component of the image signal can be derived and integrated. The low frequency component passed by the low pass filter 8 is sampled and held in the sample hold circuit 12 and the sampled signal is superimposed on the filtered analog image signal. As a result, the level of the low frequency component of the image signal which is changed due to either the unevenness of the brightness of the light source and the unevenness of the property of the camera system can be averaged. The averaged signal obtained by the low pass filter 8 is applied to the comparator 16 as the threshold signal, whereby the filtered analog image signal can be coded in binary form by the comparator 16. That is, by the operation of the comparator 16, the relatively high frequency components contained in the filtered analog image signal can be enhanced or stressed and the low frequency component caused by the unevenness of the brightness of the light source and the camera system can be eliminated.

The sampling period and hold time of the sample hold circuit 12 are, for example, 2 msec.. This is calculated in such a manner that assuming that the image sensor is constructed of 1024 bit picture elements with 1 MHz drive, then the frequency of the sampling clock is 1 MHz. As the image sensor is a single line, the sub scanning period is 1MHz/1024 =976 Hz. The period of the picture reproduction is 976/2 Hz=488 Hz to ½ of Nyquist limit value. Thus the sampling period in a line is 1/488 Hz=2 msec.

Figure 3:
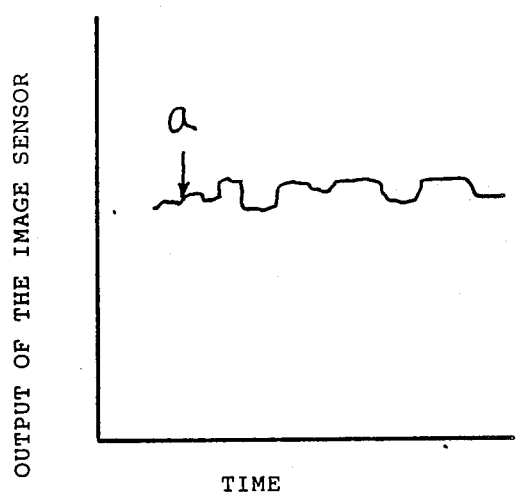
FIG. 3 is a schematic diagram showing a signal output from the image sensor which illustrates an operation of the sample hold circuit.

The sample hold circuit 12 is provided because the image sensor 2 can generate only one line data and therefore it is necessary to align the respective positions (for example the position a in FIG. 3) of the serial output of the image sensor 2 at the first scanning with the respective positions (for example the position a) of the serial output of the image sensor 2 at the second scanning.

Although the respective properties of the high pass filter 6, low pass filter 8 and sample hold circuit 12 are fixed in the present embodiment, it may be possible to arrange the respective properties adjustable independently. By arranging them adjustable as mentioned above, it is possible to perform an approximate image processing. For example, when the upper frequency limit of the high pass filter 6 is lowered, the degree of the high frequency stress appearing in the reproduced image is weakened, but it becomes easy to observe the degree of the change of the brightness of the image of the object. On the other hand, when the upper frequency limit of the low pass filter is increased, since the degree of the high frequency stressing is increased, edge stress of the image can be enhanced. When the sampling time of the sample hold circuit 12 is shortened, the degree of the averaging of the signal component in the sub scanning direction is increased and the edge stressing of the image in the sub scanning direction can be enhanced.

As mentioned above, according to the present invention, the analog image signal from the image sensor can be coded in binary form based on the threshold value corresponding to the averaged signal level which changes depending on the position of the picture in a real time manner so that it becomes unnecessary to provide a memory which is required in the prior art. And yet, when the analog image signal is coded into binary form, the image signal can be high frequency stressed so that detail of the image of the object can be expressed in the image even if the overall object is too bright or too dark. In addition, since the low frequency components of the image signal can be eliminated, undesired effects due to unevenness of the properties of the light source and/or camera system can be decreased.

What is claimed is:

1. A device for coding an analog image signal, obtained from an image sensor, into a binary image signal comprising:

low pass filter means for deriving a low frequency component signal from an added analog image signal and for integrating the derived low frequency component signal;

feed back circuit means for sampling and holding said integrated low frequency component signal derived from said low pass filter means for feeding back said sampled and held integrated low frequency component signal so as to add the sampled and held integrated low frequency component signal to the analog image signal to generate said added analog image signal; and comparator means for coding the analog image signal into a binary image signal by comparing said integrated low frequency component signal and the analog image signal using said integrated low frequency component signal as a threshold signal of said comparator means.

2. The device for coding an analog image signal according to claim 1, further comprising high pass filter means for filtering out low frequency components, DC components and undesired noise from an output of the image sensor to generate the analog image signal.

3. A method of coding an analog image signal, obtained from an image sensor, into a binary image signal comprising the steps of:

low pass filtering an added analog signal, in a low pass filter, to derive a low frequency component signal;

integrating said low frequency component signal to derive an integrated low frequency component signal;

sample and holding said integrated low frequency component signal in a feed back circuit means and feeding back said sampled and held integrated low frequency component signal so as to add said sampled and held integrated low frequency component signal to the analog image signal to generate said added analog image signal; and coding the analog image signal into a binary image signal by comparing said integrated low frequency component signal and the analog image signal using said integrated low frequency component signal as a threshold signal for said comparing.

4. The method of coding an analog image signal according to claim 3 further comprising the steps of high pass filtering low frequency components, DC components and undesired noise out from an output of the image sensor, in a high pass filter, to generate the analog image signal.

5. The method of coding an analog image signal according to claim 4 further comprising the step of decreasing the upper frequency limit of said high pass filter to weaken the degree of high frequency stress appearing in a reproduced image, obtained from said binary image signal, to enhance observation of the degree of change of brightness of said reproduced image.

6. The method of coding an analog image signal according to claim 4 further comprising the step of increasing the upper frequency limit of said low pass filter to increase the degree of high frequency stress to enhance edge stress of a reproduced image obtained from said binary image signal.

7. The method of coding an analog image signal according to claim 4 further comprising the step of decreasing the sampling time of said sampling to increase the degree of averaging of said integrated low frequency component in a sub-scanning direction to enhance edge stress in said sub-scanning direction of a reproduced image obtained from said binary image signal.

* * * * *